United States Patent
Bras et al.

(10) Patent No.: US 9,969,815 B2
(45) Date of Patent: May 15, 2018

(54) PROCESS FOR MANUFACTURING A FIBRILLATED CELLULOSE POWDER SUITABLE FOR BEING DISPERSED IN AN AQUEOUS MEDIUM

(71) Applicant: Institut Polytechnique De Grenoble, Grenoble (FR)

(72) Inventors: Julien Bras, Grenoble (FR); Naceur Belgacem, Brie et Angonnes (FR); Karim Missoum, Grenoble (FR)

(73) Assignee: INSTITUT POLYTECHNIQUE DE GRENOBLE, Grenoble (FR)

( * ) Notice: Subject to any disclaimer, the term of this patent is extended or adjusted under 35 U.S.C. 154(b) by 477 days.

(21) Appl. No.: 14/410,471

(22) PCT Filed: Jun. 24, 2013

(86) PCT No.: PCT/FR2013/051467
§ 371 (c)(1),
(2) Date: Dec. 22, 2014

(87) PCT Pub. No.: WO2014/001699
PCT Pub. Date: Jan. 3, 2014

(65) Prior Publication Data
US 2015/0141531 A1    May 21, 2015

(30) Foreign Application Priority Data
Jun. 25, 2012  (FR) ...................................... 12 55997

(51) Int. Cl.
*C08B 15/00* (2006.01)
*B01F 3/12* (2006.01)
(Continued)

(52) U.S. Cl.
CPC ................ *C08B 15/00* (2013.01); *C08B 1/00* (2013.01); *C08B 15/02* (2013.01); *C08B 15/05* (2013.01); *C08B 15/08* (2013.01)

(58) Field of Classification Search
CPC ......... C08B 15/00; C08B 15/05; C08B 15/08; C08B 15/02; C08B 1/00
(Continued)

(56) References Cited

U.S. PATENT DOCUMENTS 4,144,122 A * 3/1979 Emanuelsson ......... D21H 17/07
162/158
4,481,076 A 11/1984 Herrick
(Continued)

FOREIGN PATENT DOCUMENTS

WO    2010066036 A1    6/2010
WO    2010102802 A1    9/2010

OTHER PUBLICATIONS

Zhong et al., "Colloidal stability of negatively charged cellulose nanocrystalline in aqueous systems", Carbohydrate Polymers 90 (2012) 644-649.*
(Continued)

*Primary Examiner* — Daniel S Metzmaier
(74) *Attorney, Agent, or Firm* — Moreno IP Law LLC

(57) ABSTRACT

A method for manufacturing a fibrillated cellulose powder suitable for being dispersed in an aqueous medium, comprising a step of adding a monovalent salt (e.g., sodium chloride, potassium chloride, and lithium chloride) to a fibrillated cellulose suspension, followed by a lyophilization step to provide the fibrillated cellulose powder. Also disclosed are a method of dispersing the fibrillated cellulose powder comprising the method for manufacturing with the
(Continued)

further steps of suspending the fibrillated cellulose powder in an aqueous medium and subsequent dialysis of the suspension.

6 Claims, 3 Drawing Sheets

(51) Int. Cl.
    *C08B 15/02*     (2006.01)
    *C08B 15/08*     (2006.01)
    *C08B 1/00*     (2006.01)
    *C08B 15/05*     (2006.01)
    *B01F 3/00*     (2006.01)

(58) Field of Classification Search
    USPC ................ 516/77; 435/101; 536/101, 56, 85
    See application file for complete search history.

(56) References Cited

U.S. PATENT DOCUMENTS

| | | | |
|---|---|---|---|
| 2010/0148118 A1* | 6/2010 | Beck | C08J 5/18 252/182.12 |
| 2011/0290149 A1* | 12/2011 | Beck | C08B 15/08 106/163.01 |
| 2013/0338250 A1* | 12/2013 | Umemoto | D21H 11/20 522/18 |
| 2017/0140848 A1* | 5/2017 | Abidi | H01B 1/12 |

OTHER PUBLICATIONS

Translation of the Written Opinion of the International Searching Authority in PCT/FR2013/051467, 6 pages.
International Search Report in PCT/FR2013/051467 dated Sep. 24, 2013, 2 pages.

* cited by examiner

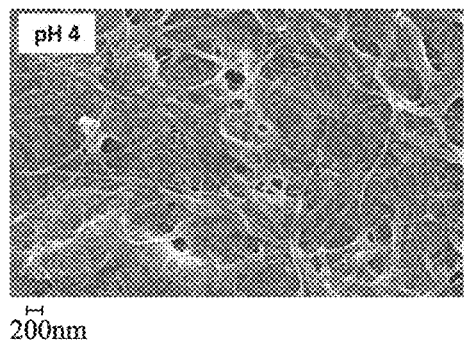# 
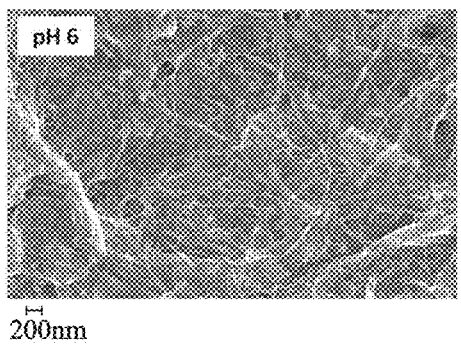
Fig 6A
Fig 6B
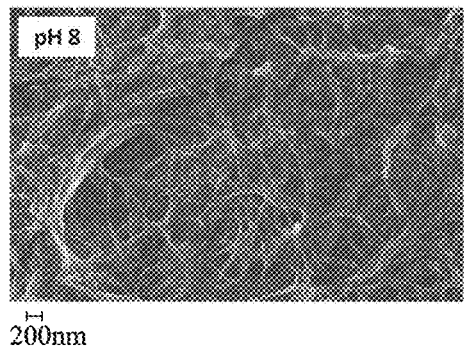
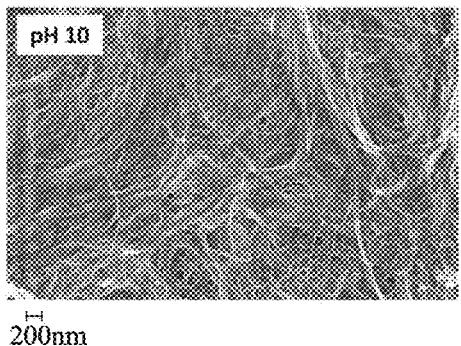
Fig 6C
Fig 6D
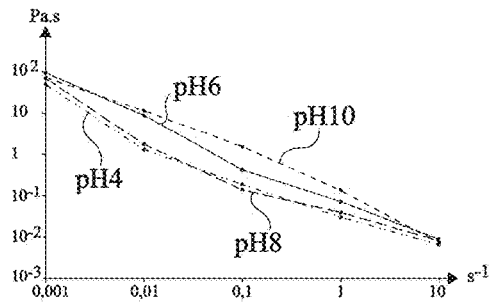
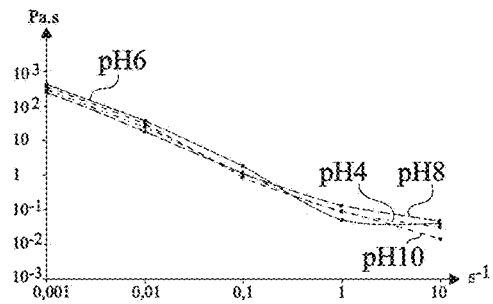
Fig 7A
Fig 7B
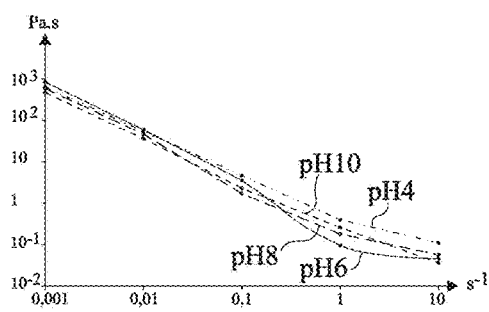
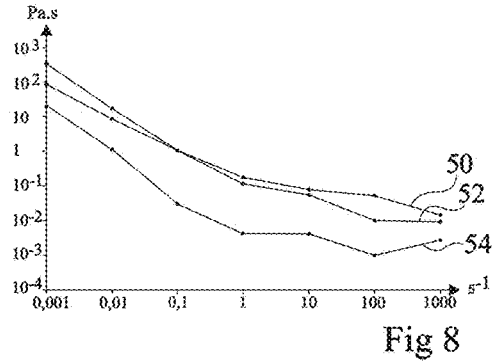
Fig 7C
Fig 8

PROCESS FOR MANUFACTURING A FIBRILLATED CELLULOSE POWDER SUITABLE FOR BEING DISPERSED IN AN AQUEOUS MEDIUM

BACKGROUND

The present invention relates to a method of manufacturing a fibrillated cellulose powder capable of being dispersed in an aqueous medium. More particularly, the present invention relates to such a method enabling to form a nanofibrillated or microfibrillated cellulose powder.

DISCUSSION OF THE RELATED ART

Cellulose is a polymer which can be found in large quantity in the biomass, and particularly in the walls of plant cells. It is formed of linearly-connected glucose chains ($\beta$-1,4 bond) to form macromolecules which naturally organize in microfibrils. Many uses and applications of cellulose are known. In addition to conventional applications such as the manufacturing of paper, textile, or wrappings, the form of cellulose has been provided to be modified for other applications.

It has in particular been provided to transform cellulose into fibrillated cellulose. When fibers have nanometer-range diameters, the fibrillated cellulose is known under acronym NFC, for NanoFibrillated Cellulose, or under acronym MFC, for MicroFibrillated Cellulose. Cellulose may also be transformed into cellulose crystals, better known as NCC (or "whiskers"), for NanoCristalline Cellulose.

The fibers contains in fibrillated cellulose typically have a length in the range from 0.5 to 2 μm and a diameter in the range from 5 to 70 nm, and are formed of a group of glucose chains. Fibrillated cellulose is formed of crystal regions and of amorphous regions. Cellulose nanocrystals (NCC) have a length in the range from 50 to 500 nm and a diameter in the range from 5 to 10 nm.

It should be noted that, in the following description, term "fibrillated cellulose" will be indifferently used for nanofibrillated or microfibrillated cellulose.

To obtain fibrillated cellulose (NFC or MFC), a mechanical treatment step is carried out on a mixture of suspended cellulose fibers (pulped), for example, from wood. This step is a mechanical disintegration of the cellulose fibers, for example, by friction of the fibers, generally carried out in a homogenizing or friction machine. Pretreatments may be carried out before or after this friction step, for example, enzyme or chemical treatments such as a carboxymethylation, according to the final desired application of the fibrillated cellulose.

The cellulose crystals (NCC) are obtained by means of chemical treatments, for example, by hydrolysis of the cellulose with a sulphuric acid treatment.

Cellulose crystals and fibrillated cellulose have quite different properties associated with their different morphologies, dimensions, and crystallinities. Particularly, cellulose crystals may be used in varnish manufacturing or in anti-counterfeiting due to their organization in liquid crystals, which is not the case for MFCs.

Fibrillated cellulose appears in suspension in the form of a thick gel. An application of this material comprises spreading this gel and then evaporating the water remaining in the gel, which provides transparent or translucent films having advantageous mechanical and/or physico-chemical properties. Particularly, such films have good properties in terms of mechanical resistance. Other properties of these films may be obtained by modifying the fibrillated cellulose manufacturing method (for example, by pretreatments).

However, a major disadvantage of fibrillated cellulose suspended in water is that gels containing such fibrillated cellulose contain but a low proportion thereof, typically from 1 to 3% by weight. This makes the transport of fibrillated cellulose particularly expensive.

Further, once fibrillated cellulose films have been formed, it is no longer possible to return to the initial gel form. Indeed, in the forming of films, strong hydrogen bonds are created between the amorphous portions of cellulose. The re-dispersion of such films in an aqueous medium is not directly possible, even by strongly stirring the produced suspension.

Thus, a method enabling to obtain fibrillated cellulose under an easily transportable form and at a decreased cost is needed.

It has been provided to transform fibrillated cellulose into a powder by methods of chemical grafting or of encapsulation of the fibrillated cellulose. This comprises, in the second case, drying a fibrillated cellulose gel after having introduced an encapsulating product, soluble in water, into the suspension. In the first case, such chemical surface grafting methods may be esterification or carbanilation methods. However, such methods are particularly complex and expensive to implement, and the obtained fibrillated cellulose once dispersed has different characteristics from the initial fibrillated cellulose.

It has also been provided spray dry a fibrillated cellulose gel to form dry fibrillated cellulose clusters. Such clusters are more easily transportable than the fibrillated cellulose gel, but have the disadvantage of only containing few fibrillated celluloses agglomerated together. Further, a good dispersion of the obtained powder in an aqueous medium has not been demonstrated to date.

SUMMARY

An object of an embodiment is to provide a method of manufacturing a fibrillated cellulose powder capable of being dispersed in an aqueous medium.

An object of an embodiment is to provide such a method enabling to form a powder which, once dispersed in an aqueous medium, has properties identical to those of the initial product.

An object of an embodiment is to provide an inexpensive method.

Another object of an embodiment is to provide a method of dispersing a powder obtained by this manufacturing method.

Thus, an embodiment of the present invention provides a method of manufacturing a fibrillated cellulose powder capable of being dispersed in an aqueous medium, comprising a step of adding a monovalent salt to a suspension of fibrillated cellulose, followed by a freeze drying step.

According to an embodiment of the present invention, the monovalent salt is added at a concentration in the range from 5 to 20 mmol/L.

According to an embodiment of the present invention, the monovalent salt is selected from the group comprising sodium chloride, potassium chloride, and lithium chloride.

According to an embodiment of the present invention, the fibrillated cellulose suspension comprises, by weight, from 1 to 3% of fibrillated cellulose.

According to an embodiment of the present invention, the salt addition step is preceded by a step of pretreating the suspended fibrillated cellulose.

According to an embodiment of the present invention, the pretreatment of the fibrillated cellulose is an enzyme or chemical pretreatment, for example, a carboxymethylation.

An embodiment of the present invention further provides a method of dispersing a fibrillated cellulose powder obtained by the above manufacturing method, comprising a step of incorporating the powder in an aqueous medium, followed by a step of stirring the obtained suspension.

According to an embodiment of the present invention, the dispersion method further comprises a subsequent dialysis step.

BRIEF DESCRIPTION OF THE DRAWINGS

The foregoing and other features and advantages will be discussed in detail in the following non-limiting description of specific embodiments in connection with the accompanying drawings, among which:

FIGS. 5A to 5D and 6A to 6D are enlargements of fibrillated cellulose films formed from fibrillated cellulose powder dispersed in an aqueous medium; and FIGS. 7A to 7C and 8 are curves of the viscosity versus the shear rate of different samples obtained after dispersion of a powder formed by the method of FIG. 1.

DETAILED DESCRIPTION

A method of manufacturing a fibrillated cellulose capable of being redispersed in an aqueous medium is provided herein, the powder form ensuring an easy and inexpensive transport.

Figure 1:
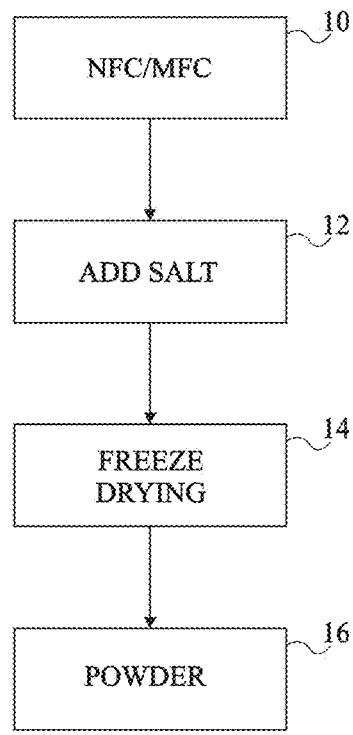
FIG. 1 is a block diagram illustrating steps of a fibrillated cellulose powder manufacturing method according to an embodiment.

FIG. 1 is a block diagram illustrating a fibrillated cellulose powder manufacturing method according to an embodiment.

At a first step 10, it is started from a fibrillated cellulose suspension (NFC or MFC) in the form of a gel. A step 12 (ADD SALT) comprises adding, into the fibrillated cellulose suspension, a monovalent salt, for example, sodium chloride NaCl, potassium chloride KCl, or also lithium chloride LiCl. The salt is added by a quantity in the range from 5 to 20 mmol/L, for example, 10 mmol/L.

A subsequent step 14 comprises freeze drying (FREEZE DRYING) the obtained gel, that is, freezing the obtained suspension and performing a drying causing the sublimation of the water contained in the gel. This provides a powder at a step 16 (POWDER).

Advantageously, carrying out a method such as described in FIG. 1 ensures the forming of a fibrillated cellulose powder capable of being dispersed in an aqueous medium for the forming of a gel having properties identical to those of the initial gel used to form the powder. This will be described in further detail hereafter.

More particularly, the method of FIG. 1 may be carried out as follows: based on a fibrillated cellulose gel, this gel may be diluted by addition of distilled water to obtain a more fluid suspension. After a control of the pH, the salt is then added. The freeze drying step may be carried out, for example, at a −81° C. temperature.

Figure 2:
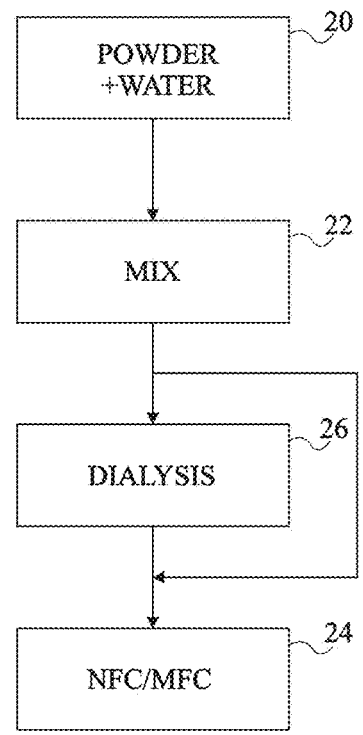
FIG. 2 is a block diagram illustrating steps of a method of dispersing a powder formed by the method of FIG. 1.

FIG. 2 is a block diagram illustrating steps of a method of dispersing in an aqueous medium a powder formed by the method of FIG. 1.

At a step 20 (POWDER+WATER), a powder obtained by the method of FIG. 1 is integrated into an aqueous medium, for example, water. It should be noted that the obtained mixture may have a ratio, by weight, of 1% of fibrillated cellulose. A subsequent step 22 (MIX) comprises strongly stirring the obtained suspension, which provides, at a step 24 (NFC/MFC), a fibrillated cellulose gel of same consistency as the initial gel.

Advantageously, the salt added in the suspension during the forming of the powder dissolves in the aqueous medium, which provides the fibrillated cellulose gel. It should be noted that, if a conventional drying is performed to form a fibrillated cellulose film, the salt molecules do not disturb the forming of hydrogen bonds and of bonds between carboxyl groups for the obtaining of the film.

An alternative embodiment comprises, between steps 22 and 24, carrying out a step 26 of dialysis (DIALYSIS) of the obtained suspension, after stirring step 22, to remove the residual salt from the suspension after dispersion. As an example, the dialysis may be carried out for 24 hours.

Figure 3:
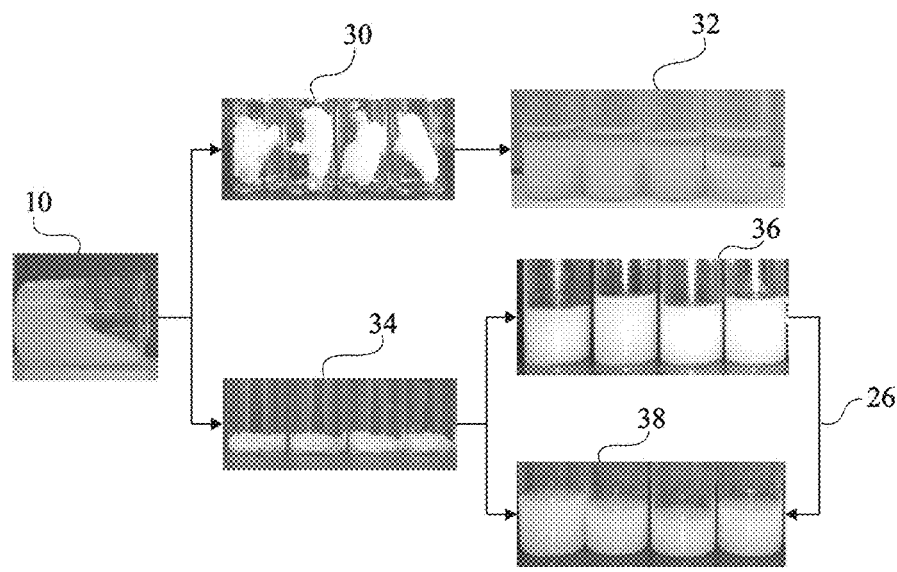
FIG. 3 illustrates different results obtained, particularly by means of the manufacturing method of FIG. 1, according to the pH of the initial fibrillated cellulose suspension.

FIG. 3 illustrates different results obtained, particularly by means of the manufacturing method of FIG. 1, according to the pH of the initial fibrillated cellulose suspension. To modify the pH of the initial suspension, sodium hydroxide may for example be added into this, suspension.

More particularly, FIG. 3 illustrates the result obtained when a fibrillated cellulose film is desired to be dispersed in an aqueous medium and when a fibrillated cellulose powder obtained by one of the methods described in relation with FIG. 2 is desired to be dispersed in an aqueous medium.

In these examples, the fibrillated cellulose is obtained from whitened wood pulp comprising, by weight, 60% of broadleaf trees and 40% of resinous trees.

In FIG. 3, a first sample 10 comprises a fibrillated cellulose gel (initial gel). As can be seen in this drawing, gel 10 is particularly viscous, although it comprises a low percentage of fibrillated cellulose (smaller than 3%).

In the example of FIG. 3, four powder samples 30 are disclosed, obtained by freeze drying of a gel 10 respectively having a pH of 4, 6, 8, and 10 (with no addition of salt). Reference 32 illustrates the result of an attempt of dispersion of the four powder samples 30 in an aqueous solution, after stirring. As can be seen, the samples 32 obtained at various pHs do not disperse in the aqueous solution: 30 seconds after the stirring, a sedimentation effect appears.

With another portion of gel 10, the method of FIG. 1 is carried out on samples of gel 10 having respective pHs of 4, 6, 8, and 10. Reference 34 illustrates the result obtained after forming of the method of FIG. 1. A powder is obtained, whatever the pH of the initial fibrillated cellulose gel. Reference 36 illustrates the result of a dispersion of the four powder samples 34 in an aqueous solution, after stirring. The samples 36 obtained at various pHs seem at first sight to correctly disperse back in the aqueous solution, and no sedimentation effect appears.

Reference 38 illustrates the result obtained from samples bearing reference 36 after dialysis step 26 has been carried out. It can be observed that the gel consistency is kept and no sedimentation can be observed.

Figure 4:
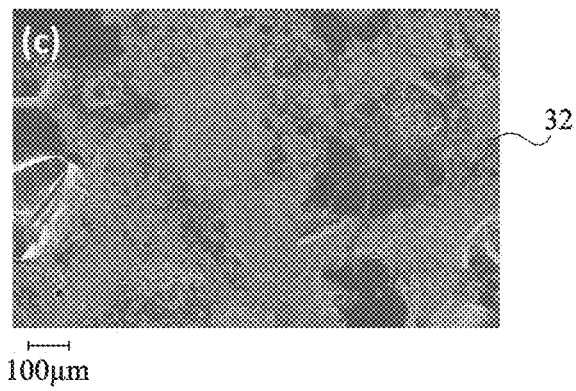
FIG. 4 is an enlarged view of the result of an attempt to disperse a fibrillated cellulose film in an aqueous medium.

FIG. 4 is an enlarged microscope view of the result of an attempt to form a fibrillated cellulose film after redispersion in an aqueous medium of the fibrillated cellulose powder of samples 30 (attempt to form a film from samples 32).

It should be noted that the results of FIG. 4, of FIGS. 5A to 5D, and of FIGS. 6A to 6D are obtained by scanning electron microscopy (SEM) integrating a field emission gun. As concerns FIG. 4, the acquisition has been performed with a 3 kV acceleration voltage for a 6.4-mm working distance. A droplet of the diluted suspension has been deposited on a substrate covered with a carbon tape and has been covered, after drying, with a 2-nm layer of a gold and palladium alloy. To characterize the samples of FIGS. 5A to 5D and 6A to 6D, an energy dispersive X-ray spectrometry (EDX) is coupled with the microscope to identify the salt distribution at the sample surface. To perform the analyses, a 15-kV voltage combined with a low vacuum (5.6.10-4 Torr) is used. A drop of each suspension has been deposited on a substrate covered with a carbon tape and has been dried to form a film.

The enlargement of FIG. 4 is performed on a film formed by evaporation of a suspension 32 having an initial pH equal to 8. It can be seen in this enlargement that the obtained film contains no fibrillated cellulose (no presence of fibers), but rather aggregations of carved film portions. This is due to the forming of hydrogen bonds, during the freeze drying enabling to form powders 30, the bonds being maintained during the dispersion attempt.

FIG. 5A to 5D are enlargement of fibrillated cellulose films obtained by evaporation of the dispersed fibrillated cellulose samples 36 of FIG. 3, according to the pH of initial suspension 10 and with no dialysis step.

Figure 5A:
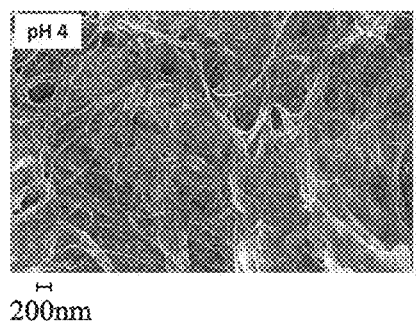
Figure 5B:
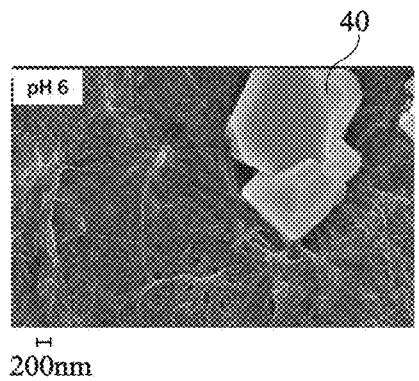
Figure 5C:
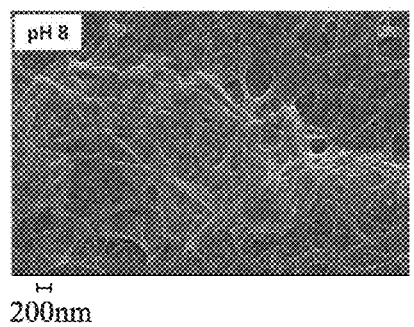
Figure 5D:
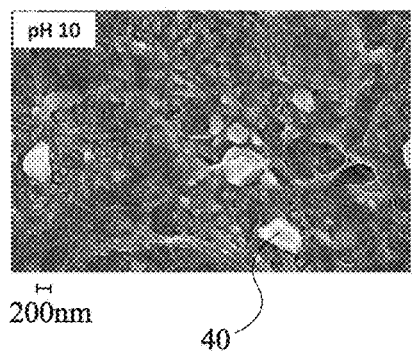

These drawings show the reappearing of the cellulose fibrils which are, for certain samples, intertwined with the salt crystals (reference numeral 40 in FIGS. 5B and 5D).

The obtained fibrils have diameters in the order of 23 nm, to within more or less 8 nm, which effectively corresponds to the basic sample. No cluster forms, as in the case of FIG. 4, which proves the effect of salt as a hydrogen bond blocker facilitating redispersion.

It should be noted that the form of the fibrillated cellulose film seems optimal for a pH around 8. Indeed, when the pH of the initial sample is equal to or smaller than 4, no carboxylate ion is present at the surface of the glucose chains. Thus, when added, the salt acts on hydrogen bonds, but the salt cation does not react with —COOH groups. With a pH equal to 6, a few carboxylate ions are present on the fibrillated cellulose, which implies a combination with the salt cations, and limits the forming of bonds between carboxyl groups. The optimal value of combination with the salt is obtained at a pH equal to 8, for which most carboxylate ions are available.

FIGS. 6A to 6D are enlargement of fibrillated cellulose films obtained by evaporation of the dispersed fibrillated cellulose samples 38 of FIG. 3, according to the pH of the initial suspension, after a dialysis step.

It should be noted in these drawings that the dialysis has enabled to remove the different salt crystals. It should be noted that the fibrillated cellulose keeps dimensions close to those of the initial sample, that is, lengths in the range from 1 to 2 μm and a diameter in the order of 21 nm, to within more or less 9 nm.

FIGS. 7A to 7C and 8 are curves of the viscosity (in Pa·s) of a sample versus the shear rate applied to the sample (in $s^{-1}$). Such measurements are obtained by using a calibrated rheometer, the sample of suspended fibrillated cellulose being placed in a closed container avoiding the evaporation of water, and thus avoiding the forming of fibrillated cellulose films.

It is here intended to limit bonds (hydrogen and covalent bonds) during the freeze drying, but also to enable to regenerate these bonds once the powder fibrillated cellulose has been redispersed in an aqueous medium. Rheological analyses enable to verify this point: it is here desired to study the viscosity of the obtained gel, which is a direct image of the number of hydrogen bonds formed during the dispersion. The greater the aggregation between fibrils, due to the many hydrogen bonds, the lower the viscosity in suspension.

FIGS. 7A to 7C illustrate the viscosity of samples originating from fibrillated cellulose having pHs varying from 4 to 10, according to the shear rate applied to the sample. More particularly, FIG. 7A illustrates the viscosity for samples 32 (obtained after attempting to disperse powder 30), FIG. 7B illustrates the viscosity for non-dialyzed samples 36 (obtained after the dispersion of fibrillated cellulose powder formed by the method of FIG. 1) and FIG. 7C illustrates the viscosity for dialyzed samples 38 (obtained after dispersion of fibrillated cellulose powder formed by the method of FIG. 1).

As shown in these drawings, the viscosity of samples 32 (FIG. 7A) is in the order of one tenth of the viscosity of samples 36 and 38 (FIGS. 7B and 7C).

FIG. 8 shows another comparison between different samples, a first curve 50 illustrating the viscosity of initial sample 10, before carrying out the method of FIG. 1, a curve 52 illustrating the viscosity of a fibrillated cellulose sample obtained after forming of a powder by the method of FIG. 1 and dispersion of this powder according to the method of FIG. 2 (sample 36 or 38), and a curve 54 illustrating the same curve for a sample 32.

In this drawing, it can be observed that the properties of samples 10 and 36/38 are almost identical, while the viscosity of sample 32 is much lower. The viscosity of the gel, and thus its capacity to form hydrogen bonds, are not affected by the passage through the powder state.

X-ray diffraction also enables to determine that the method provided herein provides a fibrillated cellulose gel having diffraction properties identical to those of the initial gel, whatever the pH of the initial gel. Indeed, diffractometry shows that the crystallinity index is not modified by the presence of salt in the gel. Thus, the crystal structure is not modified and the quality of the crystals present in the fibrillated cellulose is identical according to samples.

The method provided herein thus provides an easily-transportable powder having physico-chemical properties after dispersion identical to those of the base product. Further, a conventional drying of the suspension obtained after dispersion of the powder (obtained by the method provided herein) enables to obtain fibrillated cellulose films having the same properties as fibrillated cellulose films obtained by direct drying of the basic sample.

Thus, the method provided herein does not modify the morphological and structural properties of fibrillated cellulose, as is the case for the other known methods.

Specific embodiments of the present invention have been described. Various alterations and modifications will occur to those skilled in the art. In particular, during the freeze drying step, it may be provided to modify the structure of the fibrillated cellulose powder to incorporate therein elements providing, after dispersion in an aqueous medium, improved properties of the fibrillated cellulose films.

Further, although fibrillated cellulose (NFC/MFC) has been considered herein, it should be noted that the method provided herein also applies to fibrillated cellulose having been submitted to pretreatments, during the method for obtaining it as a gel or after this method, for example, enzyme or chemical pretreatments such as a carboxymethylation.

The invention claimed is:

1. A method of dispersing a fibrillated cellulose powder, comprising:
   adding (12) a monovalent salt selected from the group consisting of sodium chloride, potassium chloride, and lithium chloride to a suspension of fibrillated cellulose, followed by freeze drying (14) to provide the fibrillated cellulose powder;
   incorporating said powder in an aqueous medium (20) to provide a suspension, followed by stirring (22) of the suspension; and
   performing dialysis (26) on the suspension.

2. The method of claim 1, wherein monovalent salt is added at a concentration in the range from 5 to 20 mmol/L.

3. The method of claim 1, wherein the suspension of fibrillated cellulose comprises, by weight, from 1 to 3% of fibrillated cellulose.

4. The method of claim 1, wherein the salt addition step is preceded by a step of pretreating the suspended fibrillated cellulose.

5. The method of claim 4, wherein the pretreatment of the fibrillated cellulose is an enzyme or chemical pretreatment, for example, a carboxymethylation.

6. A method of dispersing a fibrillated cellulose powder, the method comprising:
   adding (12) a monovalent salt to a suspension of fibrillated cellulose;
   freeze drying (14) the combination of the monovalent salt and suspension of fibrillated cellulose to provide the fibrillated cellulose powder;
   incorporating the fibrillated cellulose powder in an aqueous medium (20) to provide a suspension;
   stirring (22) the suspension; and
   performing a dialysis step (26) on the suspension.

* * * * *